(12) United States Patent
Mauk et al.

(10) Patent No.: US 9,293,914 B2
(45) Date of Patent: Mar. 22, 2016

(54) POWER MANAGEMENT SYSTEM THAT INCLUDES A GENERATOR CONTROLLER

(75) Inventors: Richard A. Mauk, Sheboygan, WI (US); Eric D. Albsmeier, Sheboygan, WI (US)

(73) Assignee: Kohler Co, Kohler, WI (US)

( * ) Notice: Subject to any disclaimer, the term of this patent is extended or adjusted under 35 U.S.C. 154(b) by 448 days.

(21) Appl. No.: 13/289,579

(22) Filed: Nov. 4, 2011

(65) Prior Publication Data
US 2013/0116840 A1    May 9, 2013

(51) Int. Cl.
| | |
|---|---|
| H02J 1/00 | (2006.01) |
| G06Q 50/06 | (2012.01) |
| F24F 11/00 | (2006.01) |
| G06G 7/635 | (2006.01) |
| H02J 13/00 | (2006.01) |
| H02J 7/14 | (2006.01) |

(52) U.S. Cl.
CPC ............... *H02J 1/00* (2013.01); *H02J 13/0003* (2013.01); *H02J 7/1415* (2013.01)

(58) Field of Classification Search
CPC .................................................... H02J 13/0003
USPC .......................................... 700/286, 276, 287
See application file for complete search history.

(56) References Cited

U.S. PATENT DOCUMENTS

| | | |
|---|---|---|
| 4,031,406 A | 6/1977 | Leyde et al. |
| 4,034,233 A | 7/1977 | Leyde |
| 4,064,485 A | 12/1977 | Leyde |
| 4,099,067 A | 7/1978 | Szentes et al. |
| 4,639,657 A | 1/1987 | Frierdich |
| 4,701,690 A | 10/1987 | Fernandez et al. |
| 4,731,547 A | 3/1988 | Alenduff et al. |
| 4,800,291 A | 1/1989 | Bowers |

(Continued)

FOREIGN PATENT DOCUMENTS

| | | |
|---|---|---|
| CN | 1643760 A | 7/2005 |
| CN | 1710803 A | 12/2005 |
| WO | WO-2013067123 A1 | 5/2013 |

OTHER PUBLICATIONS

"International Application Serial No. PCT/US2012/062971, International Search Report mailed Jan. 22, 2013", 2 pgs.

(Continued)

*Primary Examiner* — Mohammad Ali
*Assistant Examiner* — Yuhui R Pan
(74) *Attorney, Agent, or Firm* — Schwegman Lundberg & Woessner, P.A.

(57) ABSTRACT

Some embodiments relate to a power management system that includes an engine-driven generator and a plurality of load switching and sensor modules that are located remotely from the generator. The load switching and sensor modules include power switching devices and/or sensor circuits. In some embodiments, the power switching devices are operated to selectively provide protected power from a breaker to loads. The power management system further includes a generator controller that is mounted to the engine-driven generator. The generator controller is configured to operate the engine-driven generator and the sensor and load switching modules. The generator controller is further configured to receive input signals from the load switching and sensor modules via a databus, and provide commands to the load switching and sensor modules via the databus to operate the power switching devices and selectively provide power to loads.

15 Claims, 3 Drawing Sheets

(56) References Cited

U.S. PATENT DOCUMENTS

| | | | |
|---|---|---|---|
| 5,294,879 A | 3/1994 | Freeman | |
| 5,414,640 A | 5/1995 | Seem | |
| 5,422,517 A | 6/1995 | Verney et al. | |
| 5,604,421 A | 2/1997 | Barnsley | |
| 5,640,060 A | 6/1997 | Dickson | |
| 5,684,710 A | 11/1997 | Ehlers et al. | |
| 5,761,073 A | 6/1998 | Dickson | |
| 5,861,683 A | 1/1999 | Engel et al. | |
| 5,880,537 A | 3/1999 | Windhorn | |
| 5,896,418 A * | 4/1999 | Hamano et al. | 375/259 |
| 6,104,171 A | 8/2000 | Dvorsky et al. | |
| 6,107,927 A | 8/2000 | Dvorsky et al. | |
| 6,163,088 A | 12/2000 | Codina et al. | |
| 6,172,432 B1 | 1/2001 | Schnackenberg et al. | |
| 6,191,500 B1 | 2/2001 | Toy | |
| 6,525,430 B1 * | 2/2003 | Asai et al. | 290/1 A |
| 6,552,888 B2 | 4/2003 | Weinberger | |
| 6,555,929 B1 * | 4/2003 | Eaton et al. | 290/40 B |
| 6,631,310 B1 | 10/2003 | Leslie | |
| 6,653,821 B2 | 11/2003 | Kern et al. | |
| 6,657,416 B2 | 12/2003 | Kern et al. | |
| 6,668,629 B1 | 12/2003 | Leslie | |
| 6,686,547 B2 | 2/2004 | Kern et al. | |
| 6,739,145 B2 | 5/2004 | Bhatnagar | |
| 6,747,368 B2 | 6/2004 | Jarrett, Jr. | |
| 6,798,187 B1 | 9/2004 | Czarnecki | |
| 6,801,019 B2 | 10/2004 | Haydock et al. | |
| 6,833,694 B2 | 12/2004 | Ikekame | |
| 6,876,103 B2 | 4/2005 | Radusewicz et al. | |
| 6,912,889 B2 | 7/2005 | Staphanos et al. | |
| 6,983,640 B1 | 1/2006 | Staphanos et al. | |
| 7,015,599 B2 | 3/2006 | Gull | |
| 7,053,497 B2 | 5/2006 | Sodemann et al. | |
| 7,133,787 B2 | 11/2006 | Mizumaki | |
| 7,146,256 B2 * | 12/2006 | Hibi et al. | 700/286 |
| 7,149,605 B2 | 12/2006 | Chassin et al. | |
| 7,177,612 B2 | 2/2007 | Nakamura et al. | |
| 7,177,728 B2 | 2/2007 | Gardner | |
| 7,208,850 B2 | 4/2007 | Turner | |
| 7,218,998 B1 | 5/2007 | Neale | |
| 7,230,345 B2 | 6/2007 | Winnie et al. | |
| 7,239,045 B2 | 7/2007 | Lathrop | |
| 7,245,036 B2 | 7/2007 | Endou et al. | |
| 7,274,974 B2 | 9/2007 | Brown | |
| 7,336,003 B2 | 2/2008 | Lathrop et al. | |
| 7,345,456 B2 | 3/2008 | Gibbs et al. | |
| 7,356,384 B2 | 4/2008 | Gull et al. | |
| 7,446,425 B2 | 11/2008 | Sato | |
| 7,521,822 B2 | 4/2009 | Lorenz | |
| 7,557,544 B2 | 7/2009 | Heinz et al. | |
| 7,573,145 B2 | 8/2009 | Peterson | |
| 7,579,712 B2 | 8/2009 | Yanagihashi et al. | |
| 7,582,986 B2 | 9/2009 | Folkers et al. | |
| 7,598,623 B2 | 10/2009 | Fattal et al. | |
| 7,608,948 B2 | 10/2009 | Nearhoof et al. | |
| 7,619,324 B2 | 11/2009 | Folken et al. | |
| 7,656,060 B2 | 2/2010 | Algrain | |
| 7,687,929 B2 | 3/2010 | Fattal | |
| 7,715,951 B2 | 5/2010 | Forbes, Jr. et al. | |
| 7,747,355 B2 | 6/2010 | Bulthaup et al. | |
| 7,778,737 B2 | 8/2010 | Rossi et al. | |
| 7,786,616 B2 | 8/2010 | Naden et al. | |
| 7,795,851 B2 | 9/2010 | Ye et al. | |
| 7,836,910 B2 * | 11/2010 | Dresselhaus et al. | 137/78.3 |
| 8,027,180 B2 | 9/2011 | Nakagawa | |
| 2002/0024332 A1 * | 2/2002 | Gardner | 324/103 R |
| 2002/0079741 A1 * | 6/2002 | Anderson | 307/64 |
| 2003/0094929 A1 * | 5/2003 | Pendell | 322/44 |
| 2003/0107349 A1 | 6/2003 | Haydock et al. | |
| 2003/0187550 A1 | 10/2003 | Wilson et al. | |
| 2004/0051515 A1 | 3/2004 | Ikekame | |
| 2004/0075343 A1 | 4/2004 | Wareham et al. | |
| 2005/0059373 A1 | 3/2005 | Nakamura et al. | |
| 2005/0063117 A1 | 3/2005 | Amano et al. | |
| 2005/0072220 A1 | 4/2005 | Staphanos et al. | |
| 2005/0116814 A1 | 6/2005 | Rodgers et al. | |
| 2005/0128659 A1 | 6/2005 | Hibi et al. | |
| 2005/0188745 A1 | 9/2005 | Staphanos et al. | |
| 2005/0216131 A1 | 9/2005 | Sodemann et al. | |
| 2006/0122737 A1 * | 6/2006 | Tani et al. | 700/286 |
| 2006/0187600 A1 | 8/2006 | Brown et al. | |
| 2006/0203814 A1 | 9/2006 | Ye et al. | |
| 2006/0250114 A1 * | 11/2006 | Faberman et al. | 322/24 |
| 2006/0284843 A1 | 12/2006 | Endou et al. | |
| 2007/0010916 A1 | 1/2007 | Rodgers et al. | |
| 2007/0120538 A1 | 5/2007 | Sato | |
| 2007/0129851 A1 | 6/2007 | Rossi et al. | |
| 2007/0219669 A1 * | 9/2007 | Schaper et al. | 700/287 |
| 2007/0222294 A1 | 9/2007 | Tsukida et al. | |
| 2007/0222295 A1 | 9/2007 | Wareham et al. | |
| 2008/0157593 A1 | 7/2008 | Bax et al. | |
| 2008/0157600 A1 | 7/2008 | Marlenee et al. | |
| 2009/0108678 A1 | 4/2009 | Algrain | |
| 2009/0113874 A1 | 5/2009 | McKee | |
| 2009/0152951 A1 | 6/2009 | Algrain | |
| 2009/0179498 A1 | 7/2009 | Lathrop et al. | |
| 2009/0195224 A1 | 8/2009 | Kim | |
| 2009/0198386 A1 | 8/2009 | Kim et al. | |
| 2009/0216386 A1 | 8/2009 | Wedel | |
| 2009/0240377 A1 | 9/2009 | Batzler et al. | |
| 2009/0281673 A1 | 11/2009 | Taft | |
| 2009/0290270 A1 | 11/2009 | Ganev et al. | |
| 2010/0007313 A1 | 1/2010 | Jakeman et al. | |
| 2010/0019574 A1 | 1/2010 | Baldassarre et al. | |
| 2010/0038966 A1 | 2/2010 | Espeut, Jr. | |
| 2010/0039077 A1 | 2/2010 | Dalby | |
| 2010/0066551 A1 | 3/2010 | Bailey et al. | |
| 2010/0094475 A1 | 4/2010 | Masters et al. | |
| 2010/0102637 A1 | 4/2010 | Dozier et al. | |
| 2010/0109344 A1 | 5/2010 | Conway et al. | |
| 2010/0148588 A1 | 6/2010 | Algrain | |
| 2010/0156117 A1 | 6/2010 | Allen | |
| 2010/0156191 A1 | 6/2010 | Dozier et al. | |
| 2010/0225167 A1 | 9/2010 | Stair et al. | |
| 2011/0109291 A1 | 5/2011 | Tang et al. | |
| 2012/0049639 A1 * | 3/2012 | Besore et al. | 307/97 |

OTHER PUBLICATIONS

"International Application Serial No. PCT/US2012/062971, Written Opinion mailed Jan. 22, 2013", 5 pgs.

"International Application Serial No. PCT/US2012/062971, International Preliminary Report on Patentability mailed May 15, 2014", 7 pgs.

"Chinese Application Serial No. 201280045640.3, Office Action mailed Apr. 23, 2015", (w/English Summary), 12 pgs.

"Chinese Application No. 201280045640.3, Second Office Action mailed Nov. 3, 2015", 9 pgs.

* cited by examiner

POWER MANAGEMENT SYSTEM THAT INCLUDES A GENERATOR CONTROLLER

TECHNICAL FIELD

Embodiments pertain to a power management system, and more particularly to a power management system that includes a generator controller.

BACKGROUND

Power management systems are used to selectively provide power to various types of power consuming loads. In addition, most conventional systems are able to collect sensor data relating to operation of the power consuming loads.

One of drawbacks with existing power management systems is that they typically require numerous relatively expensive programmable modules. These numerous relatively expensive programmable modules are required in order to adequately control the various power consuming loads as well as to collect the necessary sensor data in order to effectively manage the power consuming loads.

Therefore, a need exists for a power management system that is able to control various power consuming loads without using numerous relatively expensive programmable modules. In addition, the power management system should be able to collect sensor data in order to effectively manage the power consuming loads without using numerous relatively expensive programmable modules.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
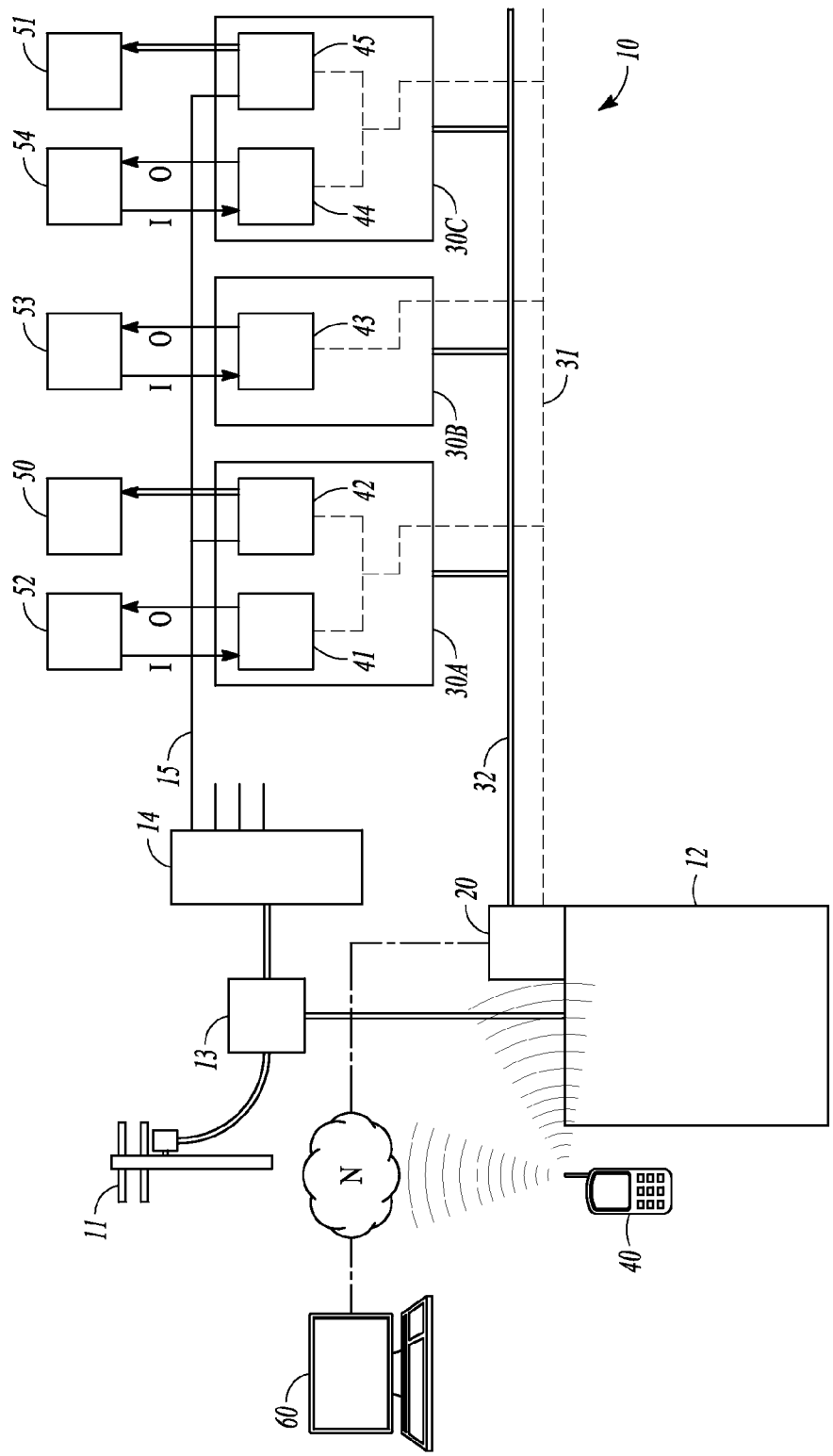
FIG. 1 is a schematic view illustrating an example power management system that includes a generator controller.

FIG. 1 is a schematic view illustrating an example power management system 10. The power management system 10 further includes an engine-driven generator 12 and a plurality of load switching and sensor modules 30A, 30B, 30C that are located remotely from the generator 12. The load switching and sensor modules 30A, 30B, 30C include power switching devices 42, 45 and/or sensor circuits 41, 43, 44. In some embodiments, the power switching devices 42, 45 are operated to selectively provide protected power from breaker panel 14 to loads 50, 51 (e.g., through source bus 15).

In the example embodiment shown in FIG. 1, power switch device 42 provides power to load 50 and power switch device 45 provides power to load 51. It should be noted that any type of power switching device that is known now, or discovered in the future, may be included in the example power management systems described herein. The type of power switching devices that are included in the power management system 10 will depend in part on cost and/or the application where the power management system 10 will be used.

In addition, sensor circuit 41 sends and receives signals I, O to/from sensor and signal output 52; sensor circuit 43 sends and receives signals I, O to/from sensor and signal output 53; and sensor circuit 44 sends and receives signals I, O to/from sensor and signal output 54. As an example, one or more of the sensors 52, 53, 54 may be a temperature sensor, switch, security sensor, flammable gas sensor, smoke sensor, CO sensor, fuel level, motion sensor, time input, thermostat, moisture sensor, light level water level weather sensor or camera sensor. It should be noted that any type of sensor that is known now, or discovered in the future, may be included in the example power management systems described herein. The type of sensors that are included in the power management system 10 will depend in part on cost and/or the application where the power management system 10 will be used. As an example, one or more of the signal outputs may be a warning signal. It should be noted that any type of signal that is known now, or discovered in the future, may be included in the example power management systems described herein. The types of signals that are included in the power management system 10 will depend in part on cost and/or the application where the power management system 10 will be used.

The power management system 10 further includes a generator controller 20 that is mounted to the engine-driven generator 12. The generator controller 20 is configured to operate the engine-driven generator 12 and the sensor and load switching modules 30A, 30B, 30C. The generator controller 20 is further configured to receive input signals from the load switching and sensor modules 30A, 30B, 30C via a databus 31, and provide commands to the load switching and sensor modules 30A, 30B, 30C via the databus 31 to operate the power switching devices 42, 45 and selectively provide power to loads 50, 51.

In some embodiments, the generator controller 20 includes a power source (not shown) that supplies power to operate the load switching and sensor modules 30A, 30B, 30C via a power bus 32. As an example, the power source may be a 12V direct current power source, although it should be noted that other sources for powering the load switching and sensor modules 30A, 30B, 30C are contemplated. In addition, the power source may be regulated by the generator controller 20.

It should be noted that the generator controller 20 may regulate power to the load switching and sensor modules 30A, 30B, 30C during startup and shut down. In addition, the loss of utility power 11 would not affect operation of the load switching and sensor modules 30A, 30B, 30C.

In the illustrated example embodiment, each of the sensor circuits 41, 43, 44 includes a sensor input circuit that receives an input signal I from a respective sensor 52, 53, 54 for delivery to the generator controller 20 via the databus 31. It should be noted that the sensor input circuit may convert the input signal I before sending the input signal to the generator controller 20.

Each of the sensor circuits 41, 43, 44 may also include a signal output circuit that transmits an output signal O received from the generator controller 20 via the databus 31 to a respective sensor 52, 53, 54. It should be noted that the sensor output circuit may convert the output signal O before sending the output signal to a respective sensor 52, 53, 54. As examples, the output signal O may relate to a run alert warning, fault, home automation, security system, door lock system, thermostat, or gated access system.

In some embodiments, the generator controller 20 may be configured to exchange data with an external communication device. As an example, the generator controller 20 may be configured to receive commands from the external communication device to activate (or deactivate) one or more of the power switching devices 42, 45 within one or more of the load switching and sensor modules 30A, 30B, 30C. In addition, the generator controller 20 may be configured to deliver signals to the external communication device that are received from the sensors 41, 43, 44 through one or more of the load switching and sensor modules 30A, 30B, 30C.

In the example embodiment illustrated in FIG. 1, the generator controller may be configured to exchange data with a wireless device 40 through a network (e.g., the Internet N). It should be noted that other embodiments are contemplated where the generator controller 20 is configured to communicate directly with the wireless device (also shown in FIG. 1).

As another example, the generator controller 20 is shown as being configured to exchange data with a personal computer 60 via a network. As yet another example, the generator controller 20 may be configured to send signals to and/or receive commands from an external device 62 (see FIG. 2) that is connected to the generator controller 20 through a USB port.

Figure 2:
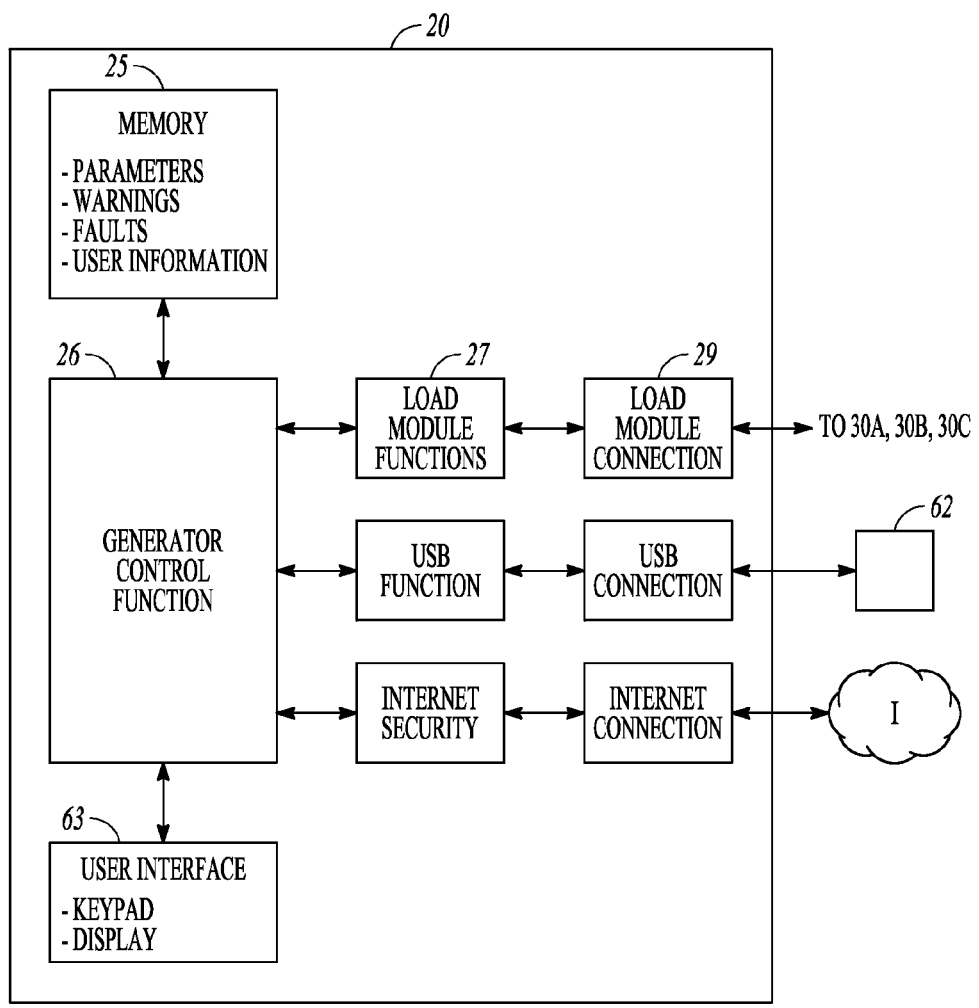
FIG. 2 is a functional block diagram of the generator controller shown in FIG. 1.

As also shown in FIG. 2, embodiments are contemplated where the generator controller 20 may be configured to receive signals at a user interface 63 and/or send commands from the user interface 63. In some embodiments, the user interface 63 is mounted to the generator controller 20. The user interface 63 may include a keyboard and/or a display that are configured to facilitate interaction with one or more of the load switching and sensor modules 30A, 30B, 30C.

In some embodiments, the generator controller 20 may be configured to store data related to the operation of any sensors 52, 53, 54 and/or the power loads 50, 51 that are included in the power management system 10. In the example embodiment that is illustrated in FIG. 2, the generator controller 20 stores and utilizes data relating to parameters, warning, faults and user information in memory 25. As examples, the generator controller 20 may be configured to store data related to sensor input ranges and conversion factors.

In addition, the generator controller 20 may store and utilize data relating to (i) generator control functions 26 (e.g., start and stop); (ii) load switching and sensor module 30A, 30B, 30C functions 27 (e.g., timers to activate the power switching devices 42, 45); and/or (iii) load switching and sensor module 30A, 30B, 30C connections 29.

Figure 3:
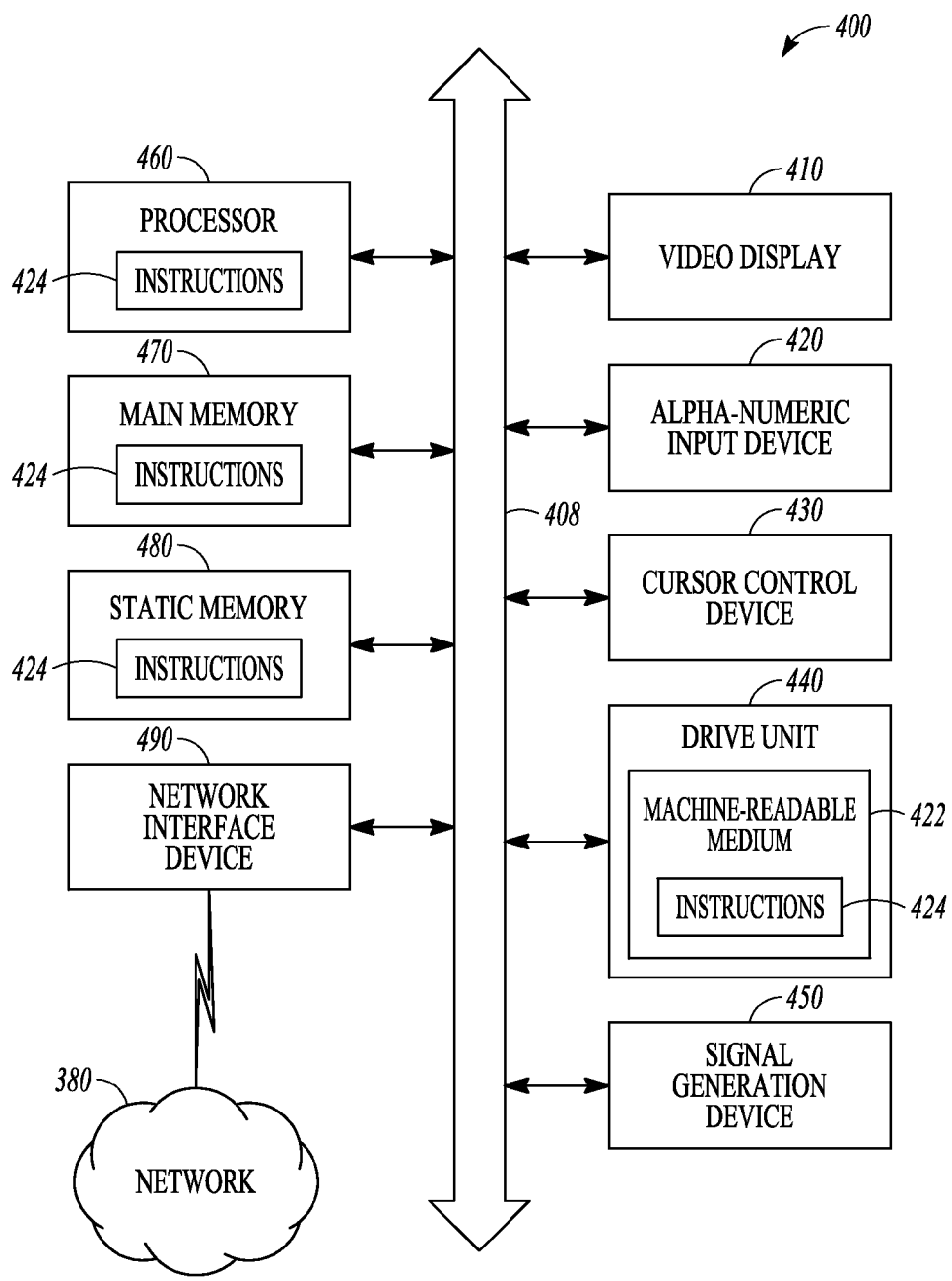
FIG. 3 is a block diagram that illustrates a diagrammatic representation of a machine in the example form of a computer system within which a set of instructions for causing the machine to perform any one or more of the methodologies discussed herein may be executed.

FIG. 3 is a block diagram that illustrates a diagrammatic representation of a machine in the example form of a computer system 400 within which a set of instructions for causing the machine to perform any one or more of the methods discussed herein may be executed. As examples, the computer system 400 may execute any of the methods that are performed by any of the disclosed example generator controllers 20, and/or disclosed example load switching and sensor modules 30A, 30B, 30C.

In some embodiments, the computer system 400 may operate in the capacity of a server or a client machine in a server-client network environment, or as a peer machine in a peer-to-peer (or distributed) network environment.

The computer system 400 may be a server computer, a client computer, a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 may include a processor 460 (e.g., a central processing unit (CPU), a graphics processing unit (GPU) or both), a main memory 470 (see also, e.g., memory 25 and generator control functions 26 in FIG. 2) and a static memory 480, all of which communicate with each other via a bus 408. The computer system 400 may further include a video display unit 410 (e.g., liquid crystal displays (LCD) or cathode ray tube (CRT)). The computer system 400 also may include an alphanumeric input device 420 (e.g., a keyboard), a cursor control device 430 (e.g., a mouse), a disk drive unit 440, a signal generation device 450 (e.g., a speaker), and a network interface device 490.

The disk drive unit 440 may include a machine-readable medium 422 on which is stored one or more sets of instructions (e.g., software 424) embodying any one or more of the methodologies or functions described herein. The software 424 may also reside, completely or at least partially, within the main memory 470, memory 25 and/or within the processor 460 during execution thereof by the computer system 400, the main memory 470 and the processor 460 also constituting machine-readable media. It should be noted that the software 424 may further be transmitted or received over a network (e.g., network 380 in FIG. 3) via the network interface device 490.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of example embodiments described herein. The term "machine-readable medium" shall accordingly be taken to include, but not be limited to, solid-state memories and optical and magnetic media.

The power management systems and methods described herein may permit control of various power consuming loads without using numerous relatively expensive programmable modules. In addition, the power management system may collect sensor data and provide output signals in order to effectively manage the power consuming loads without using numerous relatively expensive programmable modules.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A power management system comprising:
an engine-driven generator;
a load switching and sensor module located remotely from the generator, the load switching and sensor module including a power switching device and a sensor circuit;
a databus; and
a generator controller mounted to the engine-driven generator, the generator controller configured to control the engine-driven generator and the power switching device in the load switching and sensor module, the generator controller configured to receive input and output signals from the load switching and sensor module via the databus and provide commands via the databus to the load switching and sensor module in order to control the power switching device and selectively provide power to a particular load, wherein the generator controller includes a power source that is inside the generator controller and supplies power to operate the load switching and sensor module, wherein the load switching and sensor module is not connected to utility power such that the loss of utility power will not affect the operation of the load switching and sensor module;

wherein the sensor circuit includes a sensor input circuit that converts an input signal received from a sensor located remotely from the load switching and sensor module for delivery to the generator controller via the databus, and wherein the sensor circuit includes an output circuit that transmits an output signal received from the generator controller for transmission to the sensor, wherein the sensor includes at least one of a temperature sensor, security sensor, flammable gas sensor, smoke sensor, CO sensor, fuel level, motion sensor, time input, thermostat, moisture sensor, light level, water level, weather sensor or camera sensor, wherein the generator controller is configured to store data that is received from the load switching and sensor module related to the operation of the sensor and the particular load.

2. The power management system of claim 1, wherein the power source is a 12V direct current power source.

3. The power management system of claim 1, wherein the power source is regulated by the generator controller.

4. The power management system of claim 1, wherein the output signal relates to a run alert warning, fault, home automation, security system, door lock system, thermostat, or gated access system.

5. The power management system of claim 1, wherein the generator controller includes timers for activating the power switching device.

6. The power management system of claim 1, wherein the power switching device is configured to selectively provide protected power to the load.

7. The power management system of claim 6, wherein the load includes at least one of lighting, pump, fan, valve, horn, heating, defroster, refrigerator, freezer, pool, irrigation, gate, door, window covering, vent, camera recorder, vacuum, charger, fire lighter, smart appliance or cooling device.

8. The power management system of claim 1, wherein the generator controller is configured to exchange data with an external communication device.

9. The power management system of claim 8, wherein the generator controller is configured to receive commands from the external communication device to activate the power switching device.

10. The power management system of claim 8, wherein the generator controller is configured to deliver signals to the external communication device from the sensor.

11. The power management system of claim 8, wherein the generator controller is configured to exchange data with a wireless device.

12. The power management system of claim 8, wherein the generator controller is configured to exchange data with a computer via a network.

13. The power management system of claim 8, wherein the generator controller is configured to store data related to the operation of the sensor and the particular load.

14. The power management system of claim 13, wherein the generator controller is configured to store data related to sensor input ranges and conversion factors.

15. The power management system of claim 1, wherein the power source in the generator controller supplies power to the sensors and the power switching devices within the load switching and sensor module.

* * * * *